(12) United States Patent
Shepherd et al.

(10) Patent No.: US 7,190,682 B2
(45) Date of Patent: Mar. 13, 2007

(54) RADIO HEADS AND METHODS AND SYSTEMS FOR COMMUNICATING DATA BETWEEN RADIO HEADS

(75) Inventors: Johnny Shepherd, Hillsborough, NC (US); Joseph A. Repice, Apex, NC (US); Jeff Seifert, Durham, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 1022 days.

(21) Appl. No.: 10/097,967

(22) Filed: Mar. 14, 2002

(65) Prior Publication Data

US 2004/0198410 A1     Oct. 7, 2004

(51) Int. Cl.
*H04Q 7/24*     (2006.01)
(52) U.S. Cl. ...................................... 370/328
(58) Field of Classification Search ............... 455/560, 455/560.1; 370/338, 328, 345
See application file for complete search history.

(56) References Cited

U.S. PATENT DOCUMENTS

| | | | | |
|---|---|---|---|---|
| 5,715,245 | A | * | 2/1998 | Suonvieri .................... 370/337 |
| 6,026,302 | A | * | 2/2000 | Carlsson ..................... 455/446 |
| 6,792,274 | B1 | * | 9/2004 | Kapanen ..................... 455/450 |

* cited by examiner

*Primary Examiner*—Derrick W. Ferris
(74) *Attorney, Agent, or Firm*—Myers Bigel Sibley & Sajovec

(57) ABSTRACT

Radio heads, methods and systems are provided for communicating data in a radio communications system. The data communications system includes first and second radio heads. The first radio head has at least first and second transceivers. The first radio head includes a first control processor coupled with each of the at least first and second transceivers wherein the first control processor receives a first plurality of timeslots including at least one control timeslot. The first control processor reads control information from the at least one control timeslot of the first plurality of timeslots and provides the control information from the at least one control timeslot of the first plurality of timeslots to each of the first and second transceivers. Finally, the first control processor generates a second plurality of timeslots. The second radio head includes at least third and fourth transceivers. The second radio head further includes a second control processor coupled with each of the at least third and fourth transceivers wherein the second control processor receives the second plurality of timeslots including at least one control timeslot from the first control processor and reads control information from the at least one control timeslot of the second plurality of timeslots. The control processor further provides the control information from the at least one control timeslot of the second plurality of timeslots to each of the third and fourth transceivers.

37 Claims, 4 Drawing Sheets

| C1 | C2 | V1 | V2 | V3 | V4 | V5 | ... | V23 | V24 |

RADIO HEADS AND METHODS AND SYSTEMS FOR COMMUNICATING DATA BETWEEN RADIO HEADS

BACKGROUND OF THE INVENTION

The present invention relates to the field of communications and, more particularly, to radio communications.

Included among the wireless communications systems in use today are low-power wireless systems that are used to cover a limited geographic area, such as an office, a building, a campus or the like. An example of such a wireless system is a pico cell network. These wireless systems may be designed for use by wireless terminals that are also configured to access, for example, a public cellular network, such as a cellular network complying with IS-41, IS-136 or other standards. These systems typically include a plurality of radio heads, i.e. transceiver units that function in a manner similar to base stations of a conventional cellular network.

Radio heads may be located in an indoor environment. Radio heads can be geographically distributed throughout, for example, buildings. The radio heads within these buildings can all be linked to a central control cabinet that contains control processing. A mobile switching center (MSC) can communicate with the control cabinet over a leased line that complies with a carrier protocol, such as a T1, E1, or J1 carrier protocol. Each carrier protocol can support a fixed number of channels or timeslots within a frame for communicating control, voice, and data information between the mobile switching center and a control cabinet over a carrier bus. For example, the T1 carrier protocol can support 24 channels or timeslots per frame.

The MSC can communicate control information to the control cabinet over a control signaling link (CSL) (64 kb/s PCM timeslots). Conventional systems typically use a control radio interface (CRI) that supports a single CSL for all control information communicated between the MSC and the control cabinet. A single CSL can occupy one timeslot per frame on the carrier bus or, in other words, 1 of 24 timeslots per frame can be dedicated to control information.

The control cabinet may include a regional processor that may process the CSL, i.e. the control information. Once the CSL has been processed, the control information can be forwarded to a plurality of transceivers located inside each of the radio heads connected to the control cabinet. The connection between the control cabinet and the radio heads may also comply with a carrier protocol, such as T1, E1 or J1. Thus, this link may include a fixed number of timeslots, for example, 24 timeslots in the case of a T1 carrier protocol. Each radio head uses the first 8 timeslots and shifts the remaining timeslots out to the next radio head. In other words, the connection between the control cabinet and the radio heads is not a bus. This link may not be error free, thus, an error correction scheme may typically be performed.

A conventional radio head typically includes a plurality of transceivers. Since the signal processing is performed at the control cabinet by the regional processor, each of these transceivers may receive a dedicated voice timeslot and a dedicated control timeslot from the control cabinet to the transceiver. Therefore, each of the transceivers may utilize 2 of the 24 timeslots (in the case of a T1 carrier protocol) on the link between the control cabinet and the radio heads. Assuming that each radio head has four transceivers, only three radio heads utilizing 8 timeslots each may utilize a single T1 line. Accordingly, the existing architecture may limit the number of radio heads that, for example, a pico cell network, may support and may introduce unnecessary delay in the system.

SUMMARY OF THE INVENTION

According to embodiments of the present invention, radio heads, methods and systems are provided for communicating data in a radio communications system. A data communications system according to embodiments of the present invention, for example, can include first and second radio heads. The first radio head has at least first and second transceivers. The first radio head includes a first control processor coupled with each of the at least first and second transceivers wherein the first control processor receives a first plurality of timeslots including at least one control timeslot. The first control processor reads control information from the at least one control timeslot of the first plurality of timeslots and provides the control information from the at least one control timeslot of the first plurality of timeslots to each of the first and second transceivers. Finally, the first control processor generates a second plurality of timeslots. The second radio head includes at least third and fourth transceivers. The second radio head further includes a second control processor coupled with each of the at least third and fourth transceivers wherein the second control processor receives the second plurality of timeslots including at least one control timeslot from the first control processor and reads control information from the at least one control timeslot of the second plurality of timeslots. The control processor further provides the control information from the at least one control timeslot of the second plurality of timeslots to each of the third and fourth transceivers.

In some embodiments of the present invention, the at least one control timeslot of the first plurality of timeslots and the at least one control timeslot of the second plurality of timeslots are the same at least one control timeslot. The same at least one control timeslot may be an extension module regional processor (EMRP) bus that has been extended from a control cabinet to the first and second radio heads.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods and/or systems. Accordingly, the present invention may take the form of hardware embodiments, software embodiments or embodiments that combine software and hardware aspects.

The present invention is disclosed using flowchart illustrations and block diagrams. It will be understood that each block (of the flowchart illustrations and block diagrams), and combinations of blocks, can be implemented by computer program instructions. These program instructions may be provided to a processor circuit(s) within the system, such that the instructions, which execute on the processor circuit(s) create means for implementing the functions specified in the block or blocks. The computer program instructions may be executed by the processor circuit(s) to cause a series of operational steps to be performed by the processor circuit(s) to produce a computer implemented process such that the instructions which execute on the processor circuit(s) provide steps for implementing the functions specified in the block or blocks.

Embodiments of the present invention will now be described in detail below with reference to FIGS. 1 through 6, which illustrate various embodiments of the present invention. A radio communications system according to embodiments of the present invention may provide a plurality of radio heads, i.e. transceiver units that function in a manner similar to base stations of a conventional cellular network. Each radio head according to embodiments of the present invention may include a plurality of transceivers and a control signal processor. Furthermore, an extension module regional processor (EMRP) bus may be extended to the plurality of radio heads to communicate control information between radio heads. The extension of the EMRP bus to the radio heads may provide the capability of increasing the number of radio heads that may share a single link, i.e. a fixed number of timeslots, and may increase the number of voice timeslots available for voice and/or data. Furthermore, the location of the control signal processor within the radio head may decrease critical delays in the system. Embodiments of the present invention will be discussed further below.

Figure 1:
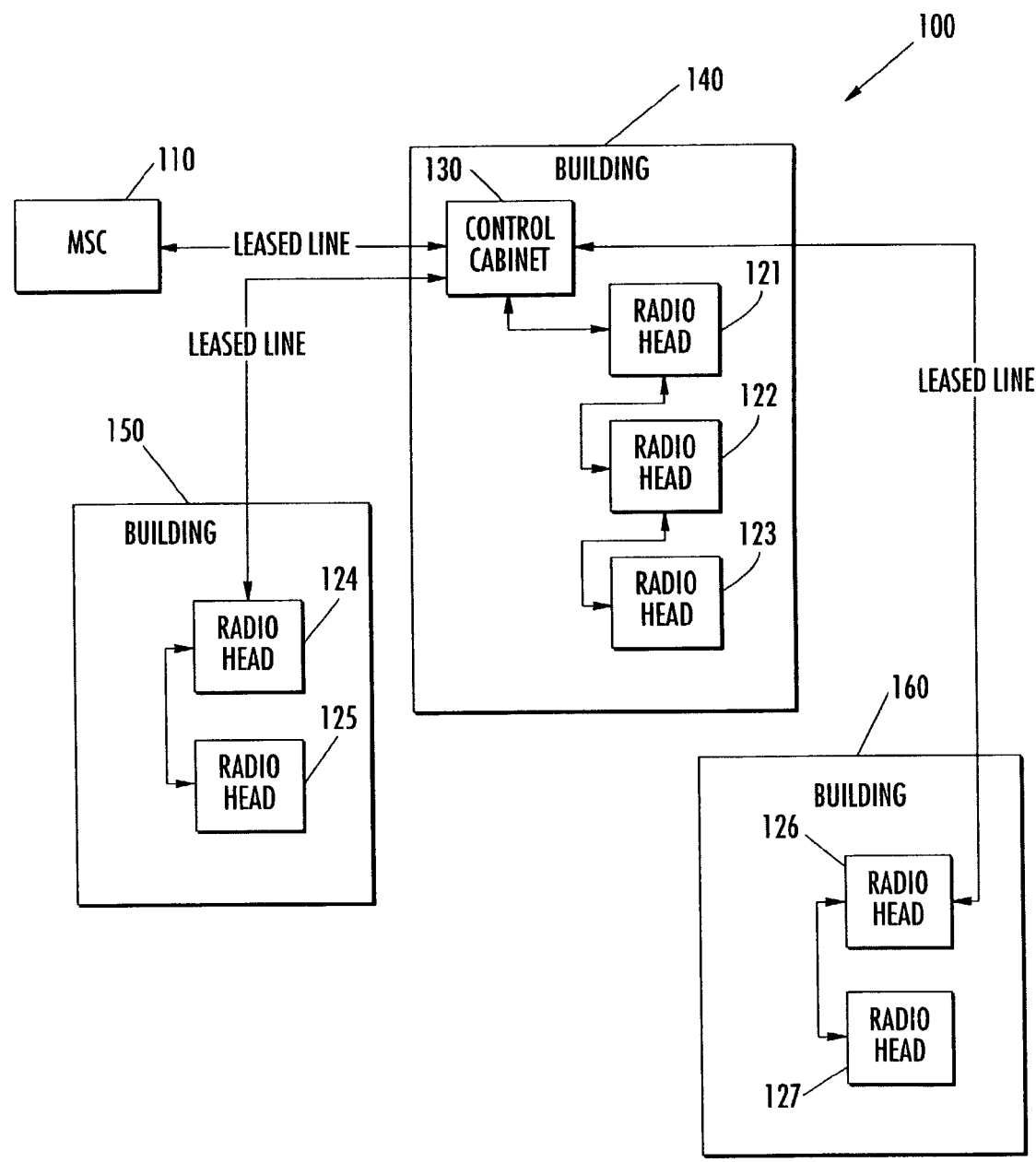
FIG. 1 is a block diagram illustrating a radio communications system according to embodiments of the present invention.

A radio communications system according to embodiments of the present invention will be discussed further below with respect to FIG. 1. Although FIG. 1 depicts a certain configuration, embodiments of the present invention should not be limited to this configuration. Any configuration of the elements of the system may be utilized without departing from the teachings of the present invention. As illustrated, a mobile switching center (MSC) 110 may communicate with the control cabinet 130 over a leased line that complies with a carrier protocol, such as a T1, E1, or J1 carrier protocol. Each carrier protocol can support a fixed number of channels or timeslots within a frame for communicating control, voice, and/or data information between the mobile switching center and a control cabinet over a carrier bus. For example, the T1 carrier protocol can support 24 channels or timeslots per frame.

The MSC 110 can communicate control information to the control cabinet 130 over a control signaling link (CSL) (64 kb/s PCM timeslots). Systems according to embodiments of the present invention typically use a control radio interface 2 (CRI2) that supports 1 to 4 control signaling link (CSL) timeslots for control information communicated between the MSC 110 and the control cabinet 130. In other words, 1 to 4 timeslots per frame, i.e. 24 timeslots using T1, of carrier data communicated between the MSC 110 and the control cabinet 130 can be dedicated to control information.

As illustrated, the control cabinet 130 may be a central control cabinet to which a series of radio heads (121–127) may be linked. As shown, the radio heads (121–127) may be geographically distributed throughout a series of buildings (140, 150, 160). Alternatively, the radio heads (121–127) may be geographically distributed within an office, on a campus or the like, but are typically located in an indoor environment.

Figure 2:
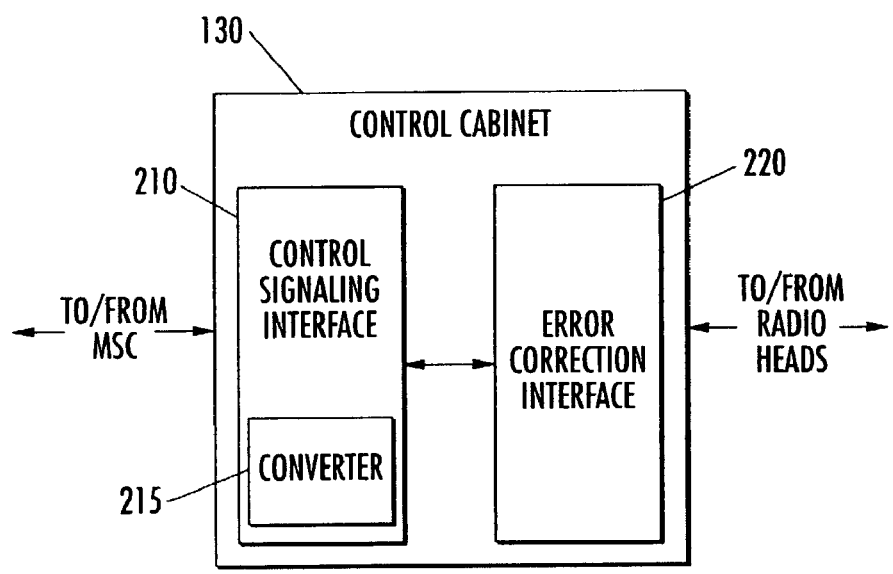
FIG. 2 is a block diagram illustrating a control cabinet according to embodiments of the present invention.

A control cabinet 130 according to embodiments of the present invention will be discussed further with respect to FIG. 2. The control cabinet 130 may include a control signaling interface 210 and error correction interface 220. The control signaling interface 210 may include a converter 215 that may extend the existing EMRP bus to service the radio heads directly, i.e. convert the link from a T1, E1, or J1 link to an EMRP bus and a plurality of voice and/or data timeslots. The EMRP bus may include one or more timeslots of control information. These timeslots of control information may be made available to each of the radio heads on the EMRP bus. The functionality of the bus will be discussed further below.

Furthermore, as discussed above, the control cabinet 130 according to embodiments of the present invention may use a Control and Radio Interface 2 (CRI2). The CRI2 may reduce both the size and the amount of required control hardware in the control cabinet 130. This reduction in size of the control hardware, may allow incorporation of control signal processing directly into a radio head, for example, radio heads (121–127), as discussed below with respect to FIG. 3.

A coupling between the control cabinet 130 and a radio head (121–127) may include a fixed number of channels/timeslots, for example, 24 timeslots in the case of a T1 carrier protocol. This link may not be assumed to be error free. Thus, an error correction interface 220 that performs an error correction scheme may be present. The error correction scheme may be a Link Access Procedure on the D channel (LAPD) 220. LAPD may, for example, be incorporated into the control signaling to provide retransmission capability. It will be understood that although embodiments of the present invention are discussed with respect to LAPD, the invention should not be limited to this error correction scheme. Any error correction scheme may be implemented alone or in combination with the LAPD error correction scheme without departing from the teachings of embodiments of the present invention. For example, transmission control protocol (TCP) may be implemented alone or in combination with LAPD.

The error correction scheme may be a store and forward error correction scheme, for example, such as a LAPD protocol. A store and forward error correction scheme may introduce a delay into the system. This delay may be mainly due to the Open Systems Interconnections (OSI) Layer 2 High Level Data Link Control (HDLC) processing. A store and forward error correction scheme may include encapsulation of each transceiver control message into an HDLC frame. This HDLC frame may be divided into HDLC packets and forwarded over the communication link according to a carrier protocol, for example T1. Accordingly, the error correction interface may wait for all n bytes of the HDLC frame before it begins to process the transceiver control information. Thus, the larger the HDLC the longer the delay introduced into the transceiver control signal processing. Furthermore, the processing delay may also vary depending on the number and/or volume of messages that are being processed by the store and forward scheme. This processing delay may be further increased each time a packet traverses another radio head. The control signaling between a control signal processor and a transceiver is time/delay sensitive. Accordingly, the delay resulting from the store and forward error correction scheme in a conventional radio communications system may seriously limit the network configuration options in the system.

Figure 3:
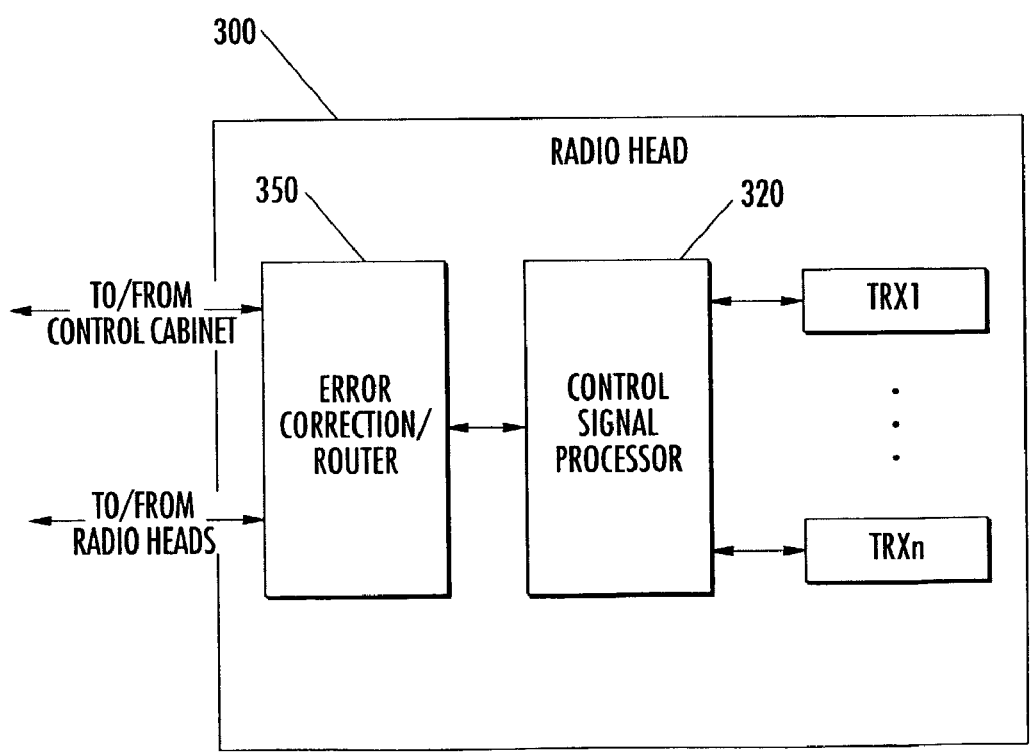
FIG. 3 is a block diagram illustrating a radio head according to embodiments of the present invention.

Now referring to FIG. 3, a radio head 300 according to embodiments of the present invention will be discussed further below. It will be understood that radio head 300 may represent any of the radio heads (121–127) illustrated in the radio communications system of FIG. 1. As illustrated in FIG. 3, a radio head 300 may include and error correction/router interface 350, a control signal processor 320, and a plurality of transceiver units (TRX1 . . . TRXn). In addition to the error correction functions discussed above, the error correction/router interface may further determine whether or not the one or more of the voice and/or data timeslots received from the control cabinet are addressed to the radio head. If it is determined that a timeslot is addressed to the radio head, the timeslot may be forwarded to the one or more of the transceivers after error correction is performed. If, on the other hand, it is determined that the timeslot is not addressed to the radio head, the timeslot may be forwarded to the next radio head in the chain of radio heads.

As discussed above, according to embodiments of the present invention, the control signal processor 320 may be incorporated into the radio head 300. In other words, the control information is processed at the radio head 300. Accordingly, the sensitive time/delay of the control signaling between the control signal processor 320 and a transceiver (TRX1 . . . TRXn), discussed above, may be reduced. In particular, the control signal processor 320 and the plurality of transceivers (TRX1 . . . TRXn) may be implemented using the same hardware, i.e. may be on the same control board. In this case, an error correction scheme may not be used between the control signal processor 320 and the plurality of transceivers (TRX1 . . . TRXn) because the data would not be communicated over a leased line where it might be corrupted. Thus, the control signaling delay may be reduced to the processing delay between the control signal processor 320 and the transceivers (TRX1 . . . TRX2). Accordingly, locating the control signal processor 320 in the radio head may decrease the critical delay of the system as discussed further below.

The plurality of transceiver units (TRX1 . . . TRXn) may function in a manner similar to base stations of a conventional cellular network. According to embodiments of the present invention, each transceiver (TRX1 . . . TRXn) may transmit over a downlink carrier and receive over an uplink carrier, and multiple channels may be provided on each carrier, for example, using time division multiple access (TDMA), code division multiple access (CDMA) or the like. The number of transceivers (TRX1 . . . TRXn) in each radio head may vary and is not limited to a particular number.

As discussed above, the control radio interface 2 (CRI2) supports multiple control signaling link (CSL) timeslots (T) for control information communicated between the MSC and the control cabinet, for example, 1 to 4 timeslots may be allocated on the carrier bus to control information from the MSC to the control cabinet. The number of timeslots dedicated to control information on the EMRP bus, i.e. the control link between the control cabinet and the radio heads will typically be T +1. Therefore, the EMRP bus may support from 2 to 5 shared T1/E1 timeslots for control information. The determination of the number of timeslots allocated to control information for each carrier bus may be determined based on the system configuration, paging and messaging requirements and the like.

The shared control timeslots on the EMRP bus may be available to each of the radio heads 300. For example, a plurality of voice and/or data timeslots and the EMRP bus may be received at the radio head 300. The control signal processor 320 may process the shared control timeslots on the EMRP bus and select the information in the shared timeslots that correspond to the transceivers (TRX1 . . . TRXn) in that particular radio head 300. The control information selected by the control signal processor 320 is distributed directly to the transceivers (TRX1 . . . TRXn) and does not need a dedicated control timeslot on the link between the control cabinet and the radio heads. In other words, all of the transceivers share a fixed number of shared control timeslots on the EMRP bus and do not each have a dedicated control timeslot. It will be understood that the control signal processor 320 may extract the relevant control information from the one or more shared timeslots on the EMRP bus. Alternatively, the control signal processor 320 may read the relevant control information from the EMRP bus without extracting the information. Accordingly, Extending the EMRP bus to the radio head 300 may increase the maximum number of radio heads that may be supported by a single T1, E1 or J1 line, may reduce the number of timeslots allocated to control information, and increase the number timeslots allocated to voice and/or data.

Figures 4, 5:
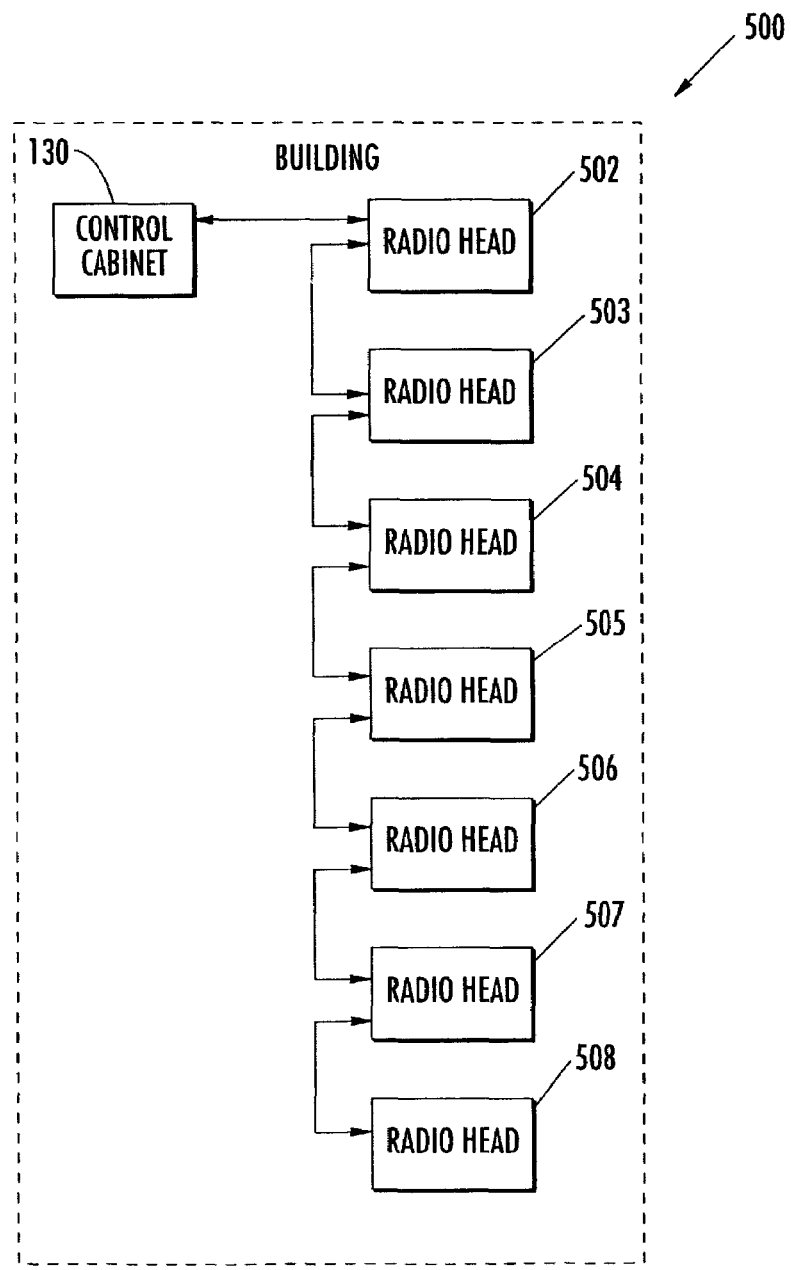
FIG. 4 illustrates an exemplary frame of data from a control cabinet to a radio head according to embodiments of the present invention.
FIG. 5 is a diagram of a radio communications system according to embodiments of the present invention.

As illustrated in FIG. 4, assuming 2 shared control timeslots on the EMRP bus, 22 timeslots remain for voice and/or data using a T1 link. This reflects a net gain of 10 timeslots for voice and/or data as compared to a system where one control timeslot is dedicated to each transceiver on a link between the control cabinet and the radio heads. Assuming, 1 voice and/or data timeslot for each transceiver and 3 transceivers per radio head, according to embodiments of the present invention, 7 radio heads may be supported by one T1 link, as illustrated, for example, in FIG. 5. A building 500 may be equipped with 7 radio heads (502–508), each having 3 transceivers that are allocated 1 voice and/or data channel/timeslot each. The control cabinet 130 communicates with the radio head 502 using, for example, 24 timeslots, with 2 of the 24 timeslots being shared control timeslots on the EMRP bus. The EMRP bus links the radio heads and provides the shared control information to each radio head. The control signal processor in each of the radio heads selects the control information that is intended for that particular radio head, forwards the control information on to its transceivers and forwards the shared control timeslots and the remaining voice and/or data timeslots on to the next radio head. Thus, the number of radio heads that can be supported by a single T1 link may be increased as well as the number of timeslots allocated to voice and/or data.

It will be understood by those having skill in the art that the control radio interface 2 (CRI2) can support up to 4 timeslots of control information on the link between the MSC to the control cabinet. It will be further understood that the number of control timeslots on the EMRP bus is typically one more than the number of control timeslots supported on the link between the MSC and the control cabinet. For example, assuming 4 control timeslots on the link between the MSC and the control cabinet, 5 control timeslots may be allocated to control information on the EMRP bus. In this situation, the maximum number of timeslots allocated to voice and/or data on the link between the control cabinet and the radio heads could be 19 (24–5) timeslots with respect to a T1 link and 26 (31–5) timeslots with respect to an E1 link.

It will be further understood that the voice and/or data timeslots for each of the transceivers is also distributed to the transceivers in the radio head. It will be further understood that the link between the radio heads is a bi-directional link. Thus, voice and/or data may be extracted from timeslots and new voice/data may be placed in the now empty timeslots for radio heads up stream. Alternatively, the voice/data may be extracted from a timeslot(s) and the timeslot(s) may be left vacant or the voice data may be read and left in the timeslot(s) for radio heads up stream.

Figure 6:
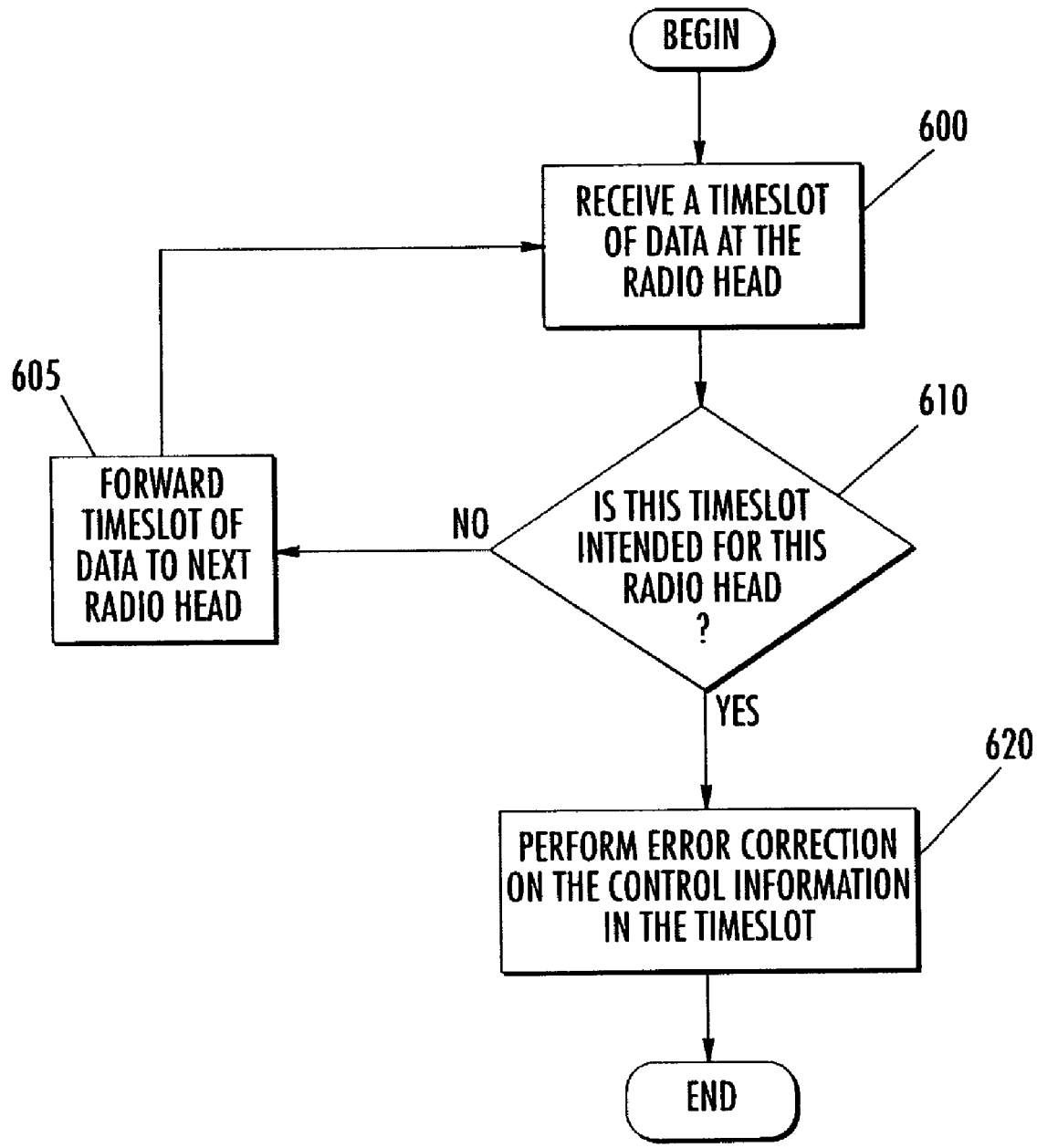
FIG. 6 is a flow chart illustrating operations of an error correction scheme according to embodiments of the present invention.

Now referring to FIG. 6, a flow chart illustrating operations of an error correction scheme according to embodiments of the present invention will be discussed. A plurality of timeslots may be received at a radio head according to embodiments of the present invention (block 600). It is determined if one of the plurality of timeslots is addressed to the radio head (block 610). This determination may be made by the router function discussed above with respect to FIG. 3. It will be understood that this determination may be made at the radio head. Alternatively, this determination may be made before the frame reaches the radio head. For example, the control message could be given an address at the MSC, i.e. address it to a particular extension module (EM). If it is determined that one of the plurality of timeslots is addressed to the radio head, error correction may be performed (block 620). Error correction can include any form of error correction as discussed above. If it is determined that one of the plurality of timeslots is not addressed to the radio head, the timeslot is forwarded to the next radio head (block 605). Alternatively, error correction may be performed for each of the plurality of timeslots at each radio head.

As discussed above, the introduction of control and radio interface 2 (CRI2) may provide the capability to locate control signal processing in a radio head. Locating the control signal processor in the radio head may reduce the delay incurred by an error correction scheme between the control signal processor and a transceiver because the control signal processor and the transceivers are located within a radio head, i.e. the information is not communicated over a leased line. It will be understood that the control signaling prior to the control signal processor is typically delay tolerant, therefore, the delays introduced by the error correction scheme done before the control signal processor will have a reduced impact on the network configuration. Furthermore, extending the EMRP bus to the radio heads may allow all of the radio heads on single link to share a fixed number of control timeslots. Accordingly, the number of control timeslots can be reduced, thereby increasing a total number of available timeslots for voice and/or data.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A radio communications system comprising:
a first radio head comprising:
at least first and second transceivers; and
a first control processor coupled with each of the at least first and second transceivers wherein the first control processor receives a first plurality of timeslots including at least one control timeslot, wherein the first control processor reads control information from the at least one control timeslot of the first plurality of timeslots, wherein the first control processor provides the control information from the at least one control timeslot of the first plurality of timeslots to each of the first and second transceivers and wherein the first control processor generates a second plurality of timeslots; and
a second radio head comprising:
at least third and fourth transceivers; and
a second control processor coupled with each of the at least third and fourth transceivers wherein the second control processor receives the second plurality of timeslots including at least one control timeslot from the first control processor, wherein the second control processor reads control information from the at least one control timeslot of the second plurality of timeslots, and wherein the control processor provides the control information from the at least one control timeslot of the second plurality of timeslots to each of the third and fourth transceivers, wherein the at least one control timeslot of the first plurality of timeslots and the at least one control timeslot of the second plurality of timeslots are the same at least one control timeslot.

2. A radio communications system according to claim 1, wherein the same at least one control timeslot is communicated to the first and second radio heads over a bus.

3. A radio communications system according to claim 2, wherein the bus is an extension module regional processor (EMRP) bus that has been extended from a control cabinet to the first and second radio heads.

4. A radio communications system according to claim 3, wherein the control cabinet includes a control signaling interface and wherein the control signaling interface receives a frame of carrier data including the at least one control timeslot containing control information from a Mobile Switching Center (MSC) over at least one carrier and converts the at least one control timeslot into the EMRP bus including the control information in the at least one control timeslot.

5. A radio communications system according to claim 4, wherein the at least one carrier is at least one of T1, E1 and/or J1.

6. A radio communications system according to claim 4, wherein the control cabinet further includes an error correction interface.

7. A radio communications system according to claim 6, wherein the error correction interface comprises at least one of a Link Access Procedure on the D Channel (LAPD) interface and/or a transmission control protocol (TCP) interface.

8. A radio communications system according to claim 1, wherein the first plurality of timeslots includes at least 19 timeslots dedicated to voice and/or data.

9. A radio communications system according to claim 1, wherein the first plurality of timeslots includes at least 26 timeslots dedicated to voice and/or data.

10. A radio communications system according to claim 1, wherein the first control processor extracts information from the at least one control time slot of the first plurality of timeslots and wherein the second control processor extracts information from the at least one control timeslot of the second plurality of timeslots.

11. A radio communications system comprising:
a first radio head comprising:
at least first and second transceivers; and
a first control processor coupled with each of the at least first and second transceivers wherein the first control processor receives a first plurality of timeslots including at least one control timeslot, wherein the first control processor reads control information from the at least one control timeslot of the first plurality of timeslots, wherein the first control processor provides the control information from the at least one control timeslot of the first plurality of timeslots to each of the first and second transceivers and wherein the first control processor generates a second plurality of timeslots; and a second radio head comprising:
at least third and fourth transceivers; and
a second control processor coupled with each of the at least third and fourth transceivers wherein the second control processor receives the second plurality of timeslots including at least one control timeslot from the first control processor, wherein the second control processor reads control information from the at least one control timeslot of the second plurality of time slots, and wherein the control processor provides the control information from the at least one control timeslot of the second plurality of timeslots to each of the third and fourth transceivers, wherein the first control processor extracts information from the at least one control timeslot of the first plurality of timeslots and wherein the second control processor extracts information from the at least one control timeslot of the second plurality of time slots and wherein the at least one control timeslot of the first plurality of timeslots and the at least one control timeslot of the second plurality of timeslots are the same at least one control timeslot, and wherein the information in the same at least one control timeslot changes from the first radio head to the second radio head due to the extraction of existing information from the at same least one control timeslot and the placement of new information in the same at least one control timeslot.

12. A radio communications system comprising:
a first radio head comprising:
at least first and second transceivers; and
a first control processor coupled with each of the at least first and second transceivers wherein the first control processor receives a first plurality of timeslots including at least one control timeslot, wherein the first control processor reads control information from the at least one control timeslot of the first plurality of timeslots, wherein the first control processor provides the control information from the at least one control timeslot of the first plurality of time slots to each of the first and second transceivers and wherein the first control processor generates a second plurality of timeslots;
a second radio head comprising:
at least third and fourth transceivers; and
a second control processor coupled with each of the at least third and fourth transceivers wherein the second control processor receives the second plurality of timeslots including at least one control timeslot from the first control processor, wherein the second control processor reads control information from the at least one control timeslot of the second plurality of timeslots, and wherein the control processor provides the control information from the at least one control timeslot of the second plurality of timeslots to each of the third and fourth transceivers; and
an error correction interface between the first radio head and the second radio head.

13. A radio communications system according to claim 12, wherein the error correction interface comprises at least one of a Link Access Procedure on the D Channel (LAPD) interface and/or a transmission control protocol (TCP) interface.

14. A radio communications system, comprising:
a mobile switching center;
a control cabinet that communicates with the mobile switching center over a carrier bus according to a carrier protocol;
a first radio head that communicates with the control cabinet, the first radio head comprising:
a first control signal processor that processes a first plurality of timeslots including at least one dedicated control timeslot; and
a first plurality of transceivers electrically coupled to the first control signal processor, the first plurality of transceivers each receiving control information from the at least one dedicated control timeslot of the first plurality of timeslots; and
a second radio head that communicates with first radio head, the second radio head comprising:
a second control signal processor that processes a second plurality of timeslots having at least one dedicated control timeslot; and
a second plurality of transceivers electrically coupled to the second control signal processor, the second plurality of transceivers each receiving control information from the at least one dedicated control timeslot of the second plurality of timeslots, wherein the at least one dedicated control timeslot of the first plurality of timeslots and the at least one dedicated control timeslot of the second plurality of timeslots are the same at least one dedicated control timeslot.

15. A radio communications system according to claim 14, wherein the second radio head receives the second plurality of timeslots from the first radio head.

16. A radio communications system according to claim 14, wherein the same at least one control timeslot is an extension module regional processor (EMRP) bus that has been extended from the control cabinet to the first and second radio heads.

17. A radio communications system according to claim 16, wherein the control cabinet further comprises a control signaling interface that receives a frame of carrier data including the at least one control timeslot including control information from a Mobile Switching Center (MSC) over at least one carrier and converts the at least one control timeslot into the EMRP bus including the control information in the at least one control timeslot.

18. A radio communications system according to claim 17, wherein the control cabinet further includes an error correction interface.

19. A radio communications system according to claim 18, wherein the error correction interface comprises at least one of a Link Access Procedure on the D Channel (LAPD) interface and/or a transmission control protocol (TCP) interface.

20. A radio communications system according to claim 14, wherein the first plurality of timeslots includes at least 19 timeslots dedicated to voice and/or data.

21. A radio communications system according to claim 14, wherein the first plurality of timeslots includes at least 26 timeslots dedicated to voice and/or data.

22. A radio communications system according to claim 14, wherein the first control signal processor extracts information from the at least one dedicated control timeslot of the first plurality of timeslots and wherein the second control signal processor extracts information from the at least one dedicated control time slot of the second plurality of timeslots.

23. A radio communications system, comprising:
a mobile switching center;
a control cabinet that communicates with the mobile switching center over a carrier bus according to a carrier protocol;
a first radio head that communicates with the control cabinet, the first radio head comprising:
a first control signal processor that processes a first plurality of timeslots including at least one dedicated control timeslot; and
a first plurality of transceivers electrically coupled to the first control signal processor, the first plurality of transceivers each receiving control information from the at least one dedicated control timeslot of the first plurality of timeslots; and
a second radio head that communicates with first radio head, the second radio head comprising:
a second control signal processor that processes a second plurality of timeslots having at least one dedicated control timeslot; and
a second plurality of transceivers electrically coupled to the second control signal processor, the second plurality of transceivers each receiving control information from the at least one dedicated control timeslot of the second plurality of timeslots, wherein the at least one dedicated control timeslot of the first plurality of timeslots and the at least one control timeslot of the second plurality of timeslots are the same at least one control timeslot, and wherein the information in the same at least one control timeslot changes from the first radio head to the second radio head due to the extraction of existing information from the at same least one control timeslot of information and the placement of new information in the same at least one control timeslot of information.

24. A radio communications system, comprising:
a mobile switching center;
a control cabinet that communicates with the mobile switching center over a carrier bus according to a carrier protocol;
a first radio head that communicates with the control cabinet, the first radio head comprising:
a first control signal processor that processes a first plurality of timeslots including at least one dedicated control timeslot; and
a first plurality of transceivers electrically coupled to the first control signal processor, the first plurality of transceivers each receiving control information from the at least one dedicated control timeslot of the first plurality of timeslots; and
a second radio head that communicates with first radio head, the second radio head comprising:
a second control signal processor that processes a second plurality of timeslots having at least one dedicated control timeslot; and
a second plurality of transceivers electrically coupled to the second control signal processor, the second plurality of transceivers each receiving control information from the at least one dedicated control timeslot of the second plurality of time slots; and
an error correction interface between the first radio head and the second radio head.

25. A radio communications system according to claim 24, wherein the error correction interface comprises at least one of a Link Access Procedure on the D Channel (LAPD) interface and/or a transmission control protocol (TCP) interface.

26. A radio head, comprising:
a control signal processor that processes a plurality of timeslots including at least one dedicated control timeslot of control information;
a plurality of transceivers electrically coupled to the control signal processor, the plurality of transceivers each receiving control information from a shared at least one dedicated control timeslot; and
an error correction interface that processes the control information from the EMRP bus before the plurality of timeslots is communicated to the control signal processor.

27. A radio head according to claim 26, wherein the at least one dedicated control timeslot is an extension module regional processor (EMRP) bus including the control information and wherein the plurality of transceivers each receive the control information from the EMRP bus.

28. A radio head according to claim 26, further comprising a router that determines which of a plurality of timeslots are addressed to the radio head.

29. A radio head according to claim 28, wherein the error correction interface only performs error correction on the plurality of timeslots that are addressed to the radio head.

30. A radio head according to claim 28, wherein the error correction interface performs error correction on each of the plurality of time slots.

31. A method for communicating data in a radio communications system including a first radio head and a second radio head, the first radio head having first and second transceivers and a first control processor coupled to the first and second transceivers and the second radio head having third and fourth transceivers and a second control processor coupled to the third and fourth transceivers, the method comprising:
receiving a first plurality of timeslots including at least one control timeslot of control information at the first control processor;
providing the at least one control timeslot of control information of the first plurality of control timeslots to each of the first and second transceivers;
generating a second plurality of timeslots at the first control processor;
receiving the second plurality of timeslots from the first control processor at the second control processor including at least one control time slot of control information; and
providing the at least one control timeslot of control information of the second plurality of control timeslots to each of the third and fourth transceivers, wherein the at least one control timeslot of the first plurality of timeslots and the at least one control timeslot of the second plurality of timeslots are the same at least one control timeslot and wherein the same at least one control timeslot is a bus.

32. A method according to claim 31, wherein the bus is an extension module regional processor (EMRP) bus that has been extended from a control cabinet to the first and second radio heads.

33. A method according to claim 32, further comprising extracting information from the BMRP bus.

34. A method according to claim 31, further comprising:
extracting information from at least one data time slot of the first plurality of timeslots; and
replacing the extracted information with new information in the at least one data timeslot to provide the second plurality of timeslots.

35. A method according to claim 31 further comprising:
receiving a first frame of carrier data at a control cabinet from a Mobile Switching Center (MSC) over a carrier through a control signaling interface, wherein the first frame is divided into a plurality of timeslots including at least one control timeslot of control information, and wherein the control signaling interface converts the at least one control timeslot of control information into an extension module regional processor (EMRP) bus including the control information; and
transmitting the EMRP bus and a plurality of voice and/or data timeslots to the first radio head.

36. A method according to claim 35, wherein the plurality of voice and/or data timeslots includes at least 19 voice and/or data timeslots.

37. A method according to claim 35, wherein the plurality of voice and/or data timeslots includes at least 26 voice and/or data timeslots.

* * * * *